(12) United States Patent
Maruyama

(10) Patent No.: US 8,752,275 B2
(45) Date of Patent: Jun. 17, 2014

(54) METHOD OF FORMING STATOR COILS OF ELECTRIC MACHINERY

(75) Inventor: Nobuchika Maruyama, Nagano (JP)

(73) Assignee: Shinano Kenshi Kabushiki Kaisha, Ueda-shi (JP)

( * ) Notice: Subject to any disclaimer, the term of this patent is extended or adjusted under 35 U.S.C. 154(b) by 322 days.

(21) Appl. No.: 13/278,712

(22) Filed: Oct. 21, 2011

(65) Prior Publication Data

US 2012/0102724 A1    May 3, 2012

(30) Foreign Application Priority Data

Nov. 2, 2010  (JP) .................................. 2010-246546

(51) Int. Cl.
*H02K 15/00* (2006.01)

(52) U.S. Cl.
USPC ..................... 29/596; 29/598; 29/605; 29/606

(58) Field of Classification Search
USPC ............ 29/596, 598, 604–606; 310/194, 198, 310/215, 260, 270
See application file for complete search history.

(56) References Cited

U.S. PATENT DOCUMENTS

| 7,649,295 | B2 * | 1/2010 | Fukui et al. | .................... 310/215 |
| 8,013,490 | B2 * | 9/2011 | Hino et al. | ..................... 310/194 |

FOREIGN PATENT DOCUMENTS

| JP | 11-027886 A | 1/1999 |
| JP | 2001-054265 A | 2/2001 |
| JP | 2008-092654 A | 4/2008 |

* cited by examiner

*Primary Examiner* — Thiem Phan
(74) *Attorney, Agent, or Firm* — Westerman, Hattori, Daniels & Adrian, LLP

(57) ABSTRACT

The method is capable of forming stator coils in dead spaces, into which a nozzle of a wire coiling machine is inserted, and improving space factor of the coils. The method comprises the steps of: regular-winding a magnet wire in vacant longitudinal outer parts of slots alternately, without getting into spaces for inserting the nozzle of the wire coiling machine; regular-winding the magnet wire in the rest vacant longitudinal outer parts of the slots and the spaces for inserting the nozzle; regular-winding the magnet wire in vacant longitudinal inner parts of the slots alternately, without getting into spaces for inserting the nozzle; and regular-winding the magnet wire in the rest vacant longitudinal inner parts of the slots and the spaces for inserting the nozzle.

6 Claims, 11 Drawing Sheets

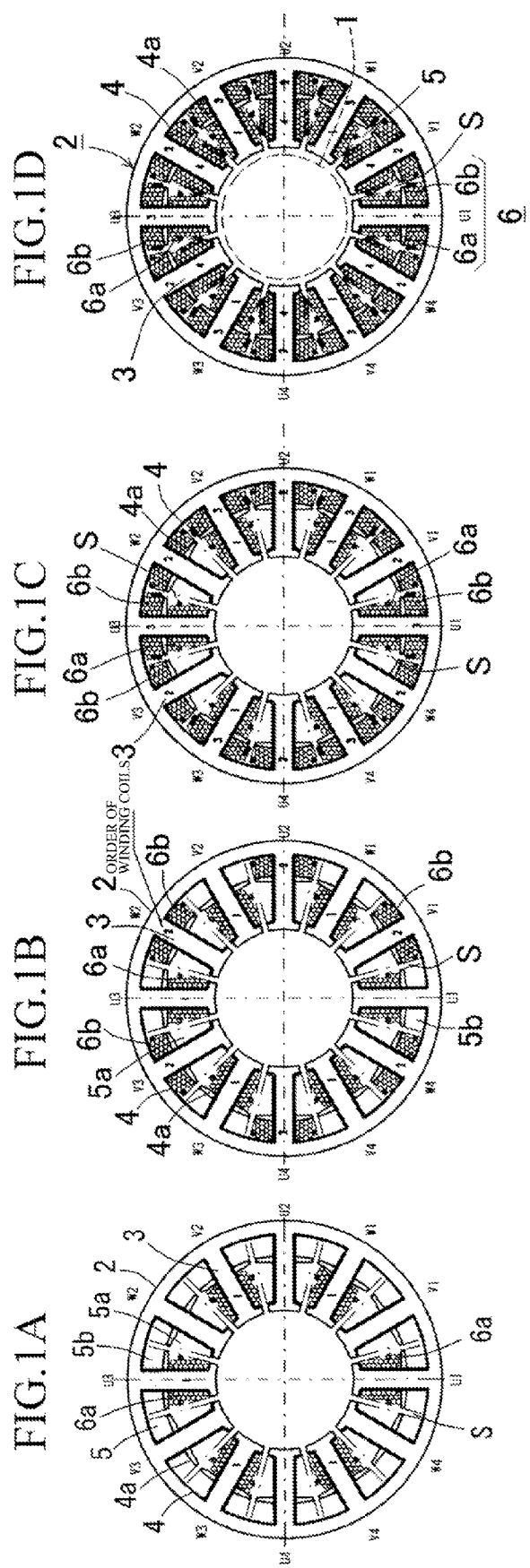

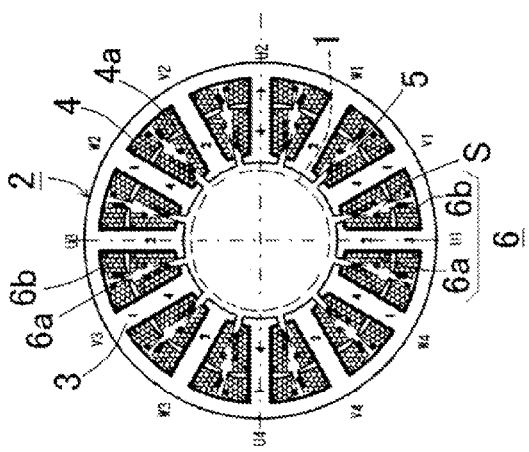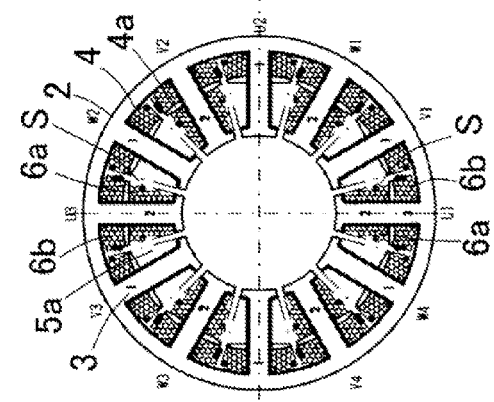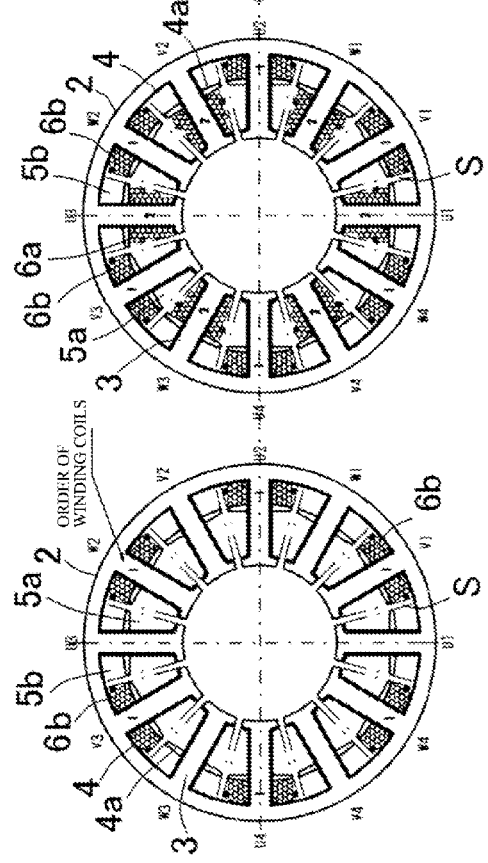

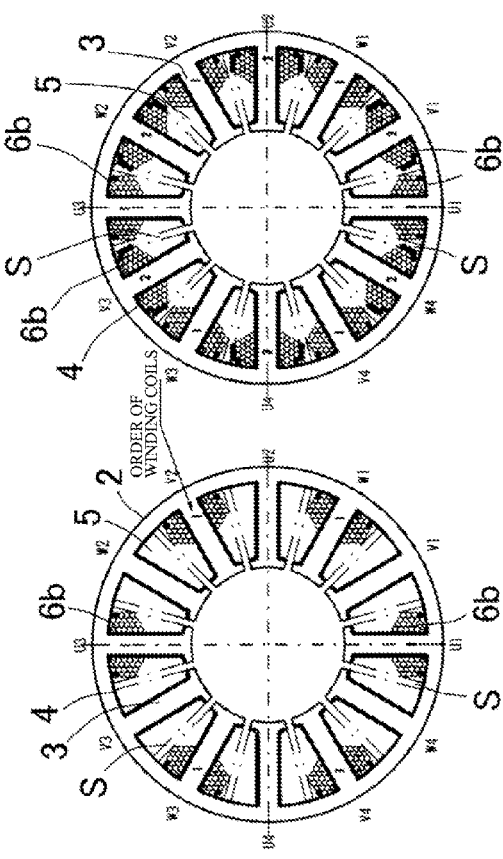

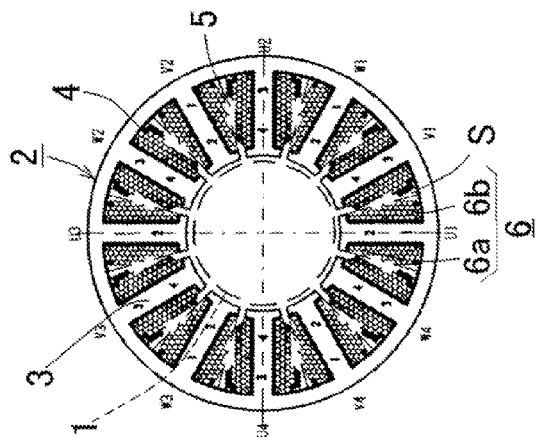
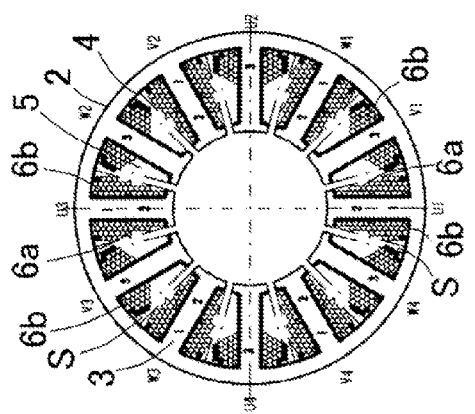
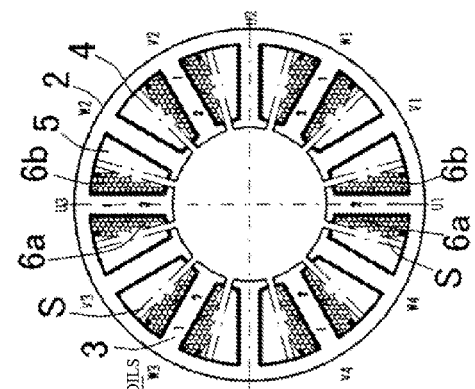
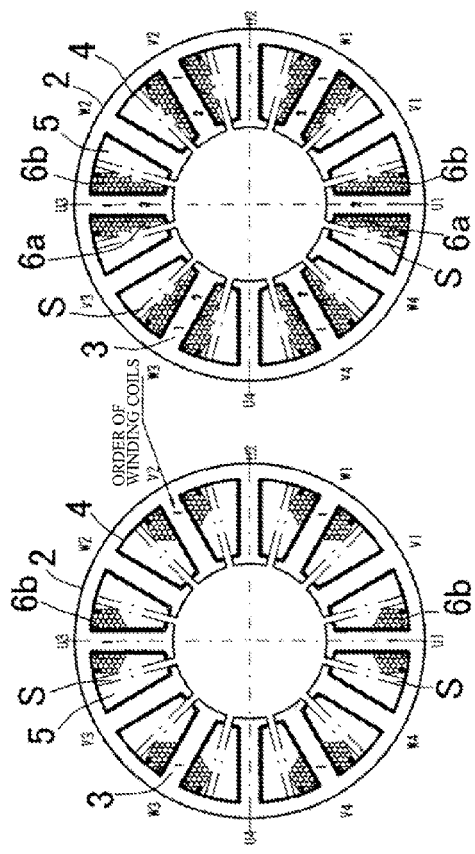

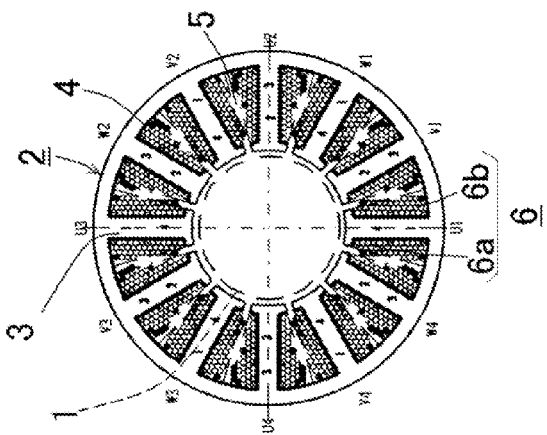
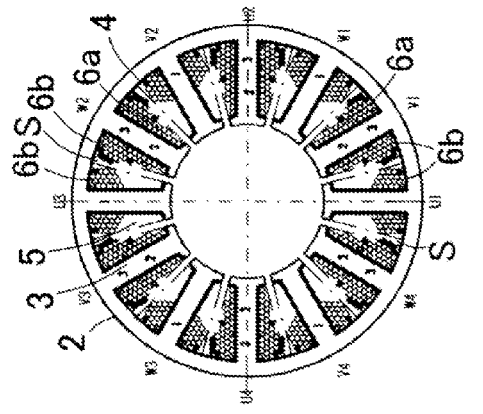
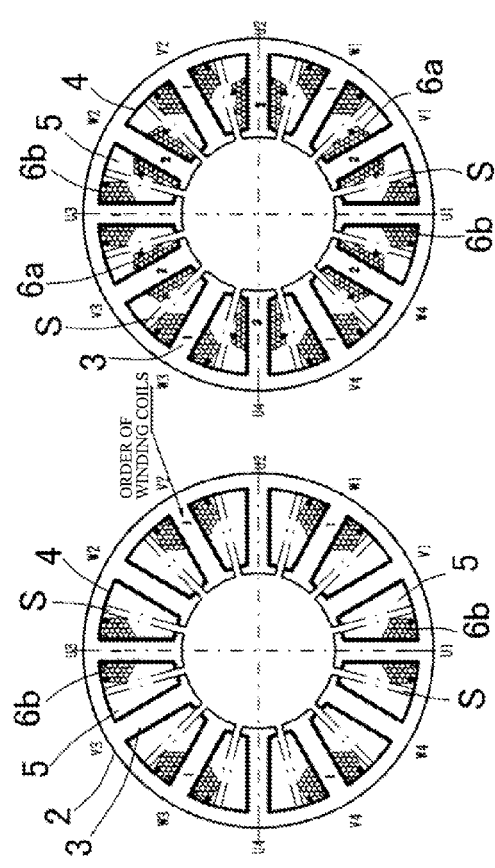

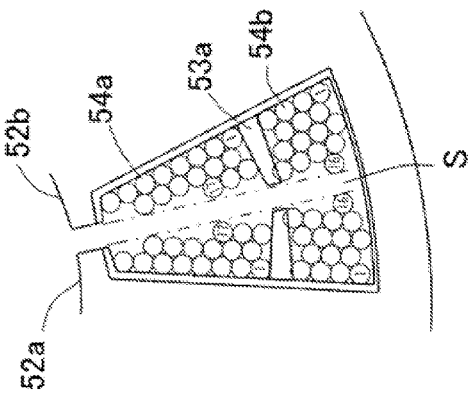
FIG.12A PRIOR ART
FIG.12B PRIOR ART
FIG.12C PRIOR ART
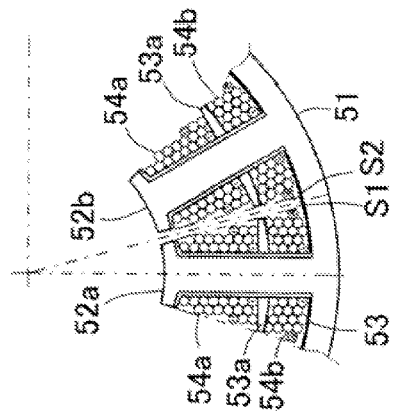
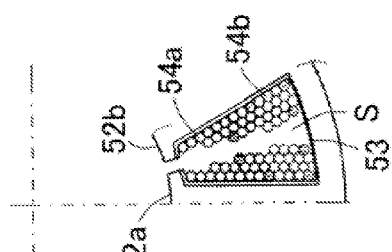
FIG.12D PRIOR ART
FIG.12E PRIOR ART
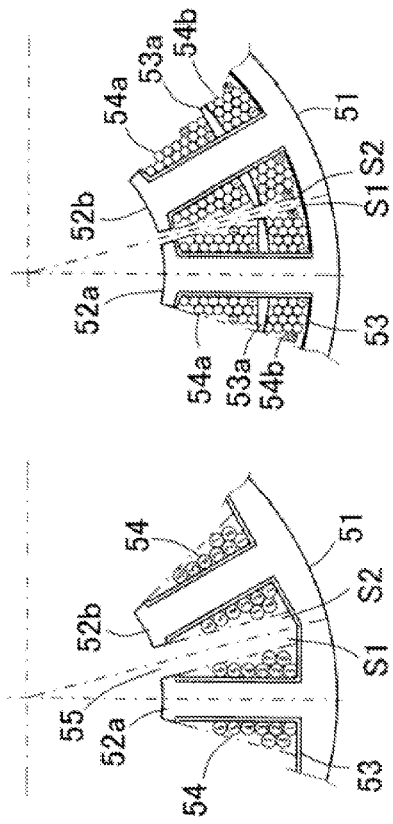
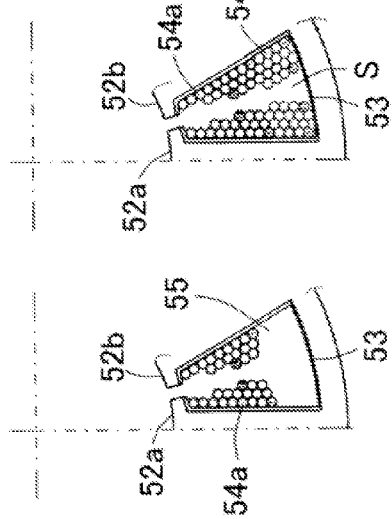

METHOD OF FORMING STATOR COILS OF ELECTRIC MACHINERY

CROSS-REFERENCE TO RELATED APPLICATION

This application is based upon and claims the benefit of priority of the prior Japanese Patent Application No. P2010-246546, filed on Nov. 2, 2010, and the entire contents of which are incorporated herein by reference.

FIELD

The present invention relates to a method of forming stator coils of electric machinery.

BACKGROUND

Electric machinery, e.g., motor, has a rotor and a stator. The stator includes a stator core having tooth sections, and magnet wires are wound on the tooth sections, which is covered with an insulator, so as to form stator coils. To improve performance of the motor, a large volume of the magnet wires are wound in gaps, each of which is formed between the adjacent tooth sections, so as to highly improve space factor of the coils.

Conventionally, nozzles of a wire coiling machine are inserted into the gaps formed between the adjacent tooth sections, in a direction of stacking stator cores, so as to wind magnet wires on the tooth sections, so the magnet wires cannot be wound in the gaps, in which the nozzles are inserted and moved. For example, in FIG. 12A, coils 54 are respectively wound on tooth sections 52a and 52b of a stator core 51, which are covered with an insulator 53. When the coils 54 are wound, a nozzle of a wire coiling machine (not shown) is inserted into a gap 55, in a direction of stacking stator cores (a direction parallel to an axial direction of the stator core), so as to wind a magnet wire on the tooth sections 52a and 52b.

To increase space factor by regular-winding the coils with preventing inferior winding, as shown in FIG. 12B, partition walls 53a, which correspond to middle parts of tooth sections 52a and 52b, are projected from an insulator 53 covering the tooth sections 52a and 52b, so each of the tooth sections 52a and 52b is divided into an inner part and an outer part. A magnet wire is wound on the inner parts and the outer parts to form inner coils 54a and outer coils 54b (see Japanese Laid-open Patent Publication No. 11-27886).

There is another method of forming stator coils, in which motor efficiency is improved by eliminating spaces for inserting nozzles (needles) of a wire coiling machine. For example, in case of forming stator coils on a circular stator core of a three-phase/12-slot/inner rotor-type motor, each of U-phase coils, V-phase coils and W-phase coils are radially formed in two slots, each of which is a space formed around each of tooth sections, by using three needles for feeding magnet wires. The needles are inserted into the slots, each of which is formed around each of the tooth sections, reciprocated in a direction of stacking stator cores and moved in the radial direction of the stator core so as to wind the magnet wires of a first layer in the slots of each phase. Then, the stator is turned 90 degrees, and the magnet wires are wound, as well. Further, the turning action and the winding action are repeated. For example, in case of winding the U-phase coils, coils U1-U4 are wound by repeating the above described actions.

Next, the needle is inserted into a radially-intermediate position of the coil U4, and then a coil U5 of a second layer is lap-wound, in an outer part, from the radially-intermediate position toward an outer end. Further, the stator is turned 180 degrees, and a coil U6 of the second layer is lap-wound, on the outer circumference of the coil U2, in the outer part, from a radially-intermediate position toward an outer end, as well as the coil U5.

Next, the needle is inserted into a radially-inner part of the slot, and a coil U7 of the second layer is lap-wound, on the coil U3 of the first layer, in an inner part, until reaching the radially-intermediate position. Further, the stator is turned 180 degrees, and a coil U8 of the second layer is lap-wound, on the outer circumference of the coil U1, in the inner part from the radially-intermediate position.

As described above, the coils U1-U4 and the coils U5-U8 are zigzag-wound, on the stator core, in the circumferential direction, so that the coils can be wound in spaces for inserting the nozzles (see Japanese Laid-open Patent Publication No. 2001-54265).

Further, another method of regular-winding coils has been invented (see Japanese Laid-open Patent Publication No. 2008-92654). In the method, the coils can be easily and high-densely wound on tooth sections of a dividable core, which are covered with an insulator, by a wire coiling machine.

After winding the coils 54 of FIG. 12A on the tooth sections 52a, 52b, etc. or after winding the coils 54a and 54b of FIG. 12B on the tooth sections 52a, 52b, etc. each of which is divided by the partition wall 53b, as described in Japanese Laid-open Patent Publication No. 11-27886, spaces S1 and S2 in each of the gaps 55, which are formed for inserting and moving the nozzle, become dead spaces S (see an enlarged view of FIG. 12C). Note that, in case that the coils 54a of inner parts and the coils 54b of outer parts are regular-wound on the tooth sections covered with the insulator having no partition walls as shown in FIGS. 12D and 12E, number of winding the magnet wires can be greater than that of the case shown in FIG. 12B. For example, in FIG. 12B, the magnet wire having a diameter of φ1.5 is multiple-wound to correspond to φ2.1 (wire diameter), total number of turn per tooth section of the coil 54a of the inner part is 192 turns (T), and number of turn of the coil 54b of the outer part is 168 T. On the other hand, in FIG. 12E, the numbers (T) are increased. Namely, the number of the coil 54a of the inner part is 216 T, and the number of the coil 54b of the outer part is 204 T. However, the spaces for moving the nozzles (the dead spaces S) must be formed in each of the gaps 55.

Especially, to apply large current at low voltage, the diameter of the magnet wires must be increased. If the diameter of the magnet wires is increased, it is difficult to regular-wind the coils. Further, if the gaps of the stator core are enlarged, it is difficult to downsize the motor.

In the method disclosed in Japanese Laid-open Patent Publication No. 2001-54265, if no supporting means are provided in the radially inner parts and radially outer parts, inferior winding will occur when the coils U5-U8 of the second layer are lap-wound on the coils U1-U4 of the first layer. So, the regular winding cannot be performed, and space factor must be lowered.

In the method disclosed in Japanese Laid-open Patent Publication No. 2001-54265, the dividable core is used, so the coils can be easily wound, but production steps and a production cost must be increased. Further, magnetic loss occurs at connection parts between divided core pieces, so performance of the motor must be lowered.

SUMMARY

Accordingly, it is objects to provide a method of forming stator coils of electric machinery, which is capable of solving the above described problems of the conventional technologies. Namely, the method of the present invention is capable of forming coils in dead spaces, into which a nozzle of a wire coiling machine is inserted, improving space factor of the coils and performance of the electric machinery and mass-producing the stator coils with low production cost.

To achieve the object, the present invention has following structures.

Namely, in the first method of forming stator coils of an electric machinery, a stator includes: a circular stator core; an even number of tooth sections being radially projected from the stator core; pluralities of slots, each of which is a space formed around each of the tooth sections, each of the slots being divided into a longitudinal outer part and a longitudinal inner part; an insulator covering the stator core and the tooth sections; and stator coils being respectively formed in the slots by multiple-winding a magnet wire on the tooth sections, the method comprises the steps of:

regular-winding the magnet wire in the vacant longitudinal outer parts of the slots alternately, without getting into spaces for inserting a nozzle of a wire coiling machine;

regular-winding the magnet wire in the rest vacant longitudinal outer parts of the slots and the spaces for inserting the nozzle of the wire coiling machine so as to arrange the coils in the circumferential direction;

regular-winding the magnet wire in the vacant longitudinal inner parts of the slots alternately, without getting into spaces for inserting the nozzle of the wire coiling machine; and regular-winding the magnet wire in the rest vacant longitudinal inner parts of the slots and the spaces for inserting the nozzle of the wire coiling machine.

With this method, the coils can be formed in the spaces, which are used to insert the nozzle and become dead spaces in the conventional technologies, and space factor of the electric machinery can be improved.

In the second method of forming stator coils of an electric machinery, a stator includes: a circular stator core; an even number of tooth sections being radially projected from the stator core; pluralities of slots, each of which is a space formed around each of the tooth sections, each of the slots being divided into a longitudinal outer part and a longitudinal inner part; an insulator covering the stator core and the tooth sections; and stator coils being respectively formed in the slots by multiple-winding a magnet wire on the tooth sections, the method comprises the steps of:

regular-winding the magnet wire in the vacant longitudinal outer parts of the slots alternately, without getting into spaces for inserting a nozzle of a wire coiling machine;

regular-winding the magnet wire in the vacant longitudinal inner parts of the slots alternately, without getting into spaces for inserting the nozzle of the wire coiling machine;

regular-winding the magnet wire in the rest vacant longitudinal outer parts of the slots and the spaces for inserting the nozzle of the wire coiling machine; and regular-winding the magnet wire in the rest vacant longitudinal inner parts of the slots and the spaces for inserting the nozzle of the wire coiling machine.

With this method, the coils can be formed in the spaces, which are used to insert the nozzle and become dead spaces in the conventional technologies, and space factor of the electric machinery can be improved.

In the third method of forming stator coils of an electric machinery, a stator included: a circular stator core; an even number of tooth sections being radially projected from the stator core; pluralities of slots, each of which is a space formed around each of the tooth sections, each of the slots being divided into a longitudinal outer part and a longitudinal inner part; an insulator covering the stator core and the tooth sections; and stator coils being respectively formed in the slots by multiple-winding a magnet wire on the tooth sections, the method comprises the steps of:

regular-winding the magnet wire in the vacant longitudinal inner parts of the slots alternately, without getting into spaces for inserting a nozzle of a wire coiling machine;

regular-winding the magnet wire in the vacant longitudinal outer parts of the slots alternately, without getting into spaces for inserting the nozzle of the wire coiling machine;

regular-winding the magnet wire in the rest vacant longitudinal outer parts of the slots and the spaces for inserting the nozzle of the wire coiling machine; and regular-winding the magnet wire in the rest vacant longitudinal inner parts of the slots and the spaces for inserting the nozzle of the wire coiling machine.

With this method, the coils can be formed in the spaces, which are used to insert the nozzle and become dead spaces in the conventional technologies, and space factor of the electric machinery can be improved.

Preferably, in each of the methods of the present invention, the insulator, which covers the tooth sections, has partition walls, each of which divides each of the slots into the longitudinal outer part and the longitudinal inner part.

By forming the partition walls, inferior winding of the coils, which occurs when the wire magnet is multiple-wound in the longitudinal outer part and the longitudinal inner part of each of the slots, can be prevented, so that the coils can be regular-wound and the space factor can be improved.

In the present invention, the coils can be formed in the spaces, into which the nozzle is inserted and regarded as dead spaces, so that the space factor can be improved, performance of the electric machinery can be improved, and the stators can be mass-produced with low production cost.

BRIEF DESCRIPTION OF THE DRAWINGS

Embodiments of the present invention will now be described by way of examples and with reference to the accompanying drawings, in which:

FIGS. 1A-1D are explanation views showing a first embodiment of the method of the present invention;

FIGS. 2A-2D are explanation views showing a second embodiment of the method of the present invention;

FIGS. 7A-7D are explanation views showing a fifth embodiment of the method of the present invention;

FIGS. 9A-9D are explanation views showing a sixth embodiment of the method of the present invention;

FIGS. 10A-10D are explanation views showing a seventh embodiment of the method of the present invention;

FIGS. 12A-12E are explanation views explaining the conventional methods of forming stator coils and dead spaces.

DETAILED DESCRIPTION OF THE EMBODIMENTS

Figures 3A, 3B, 3C, 3D:
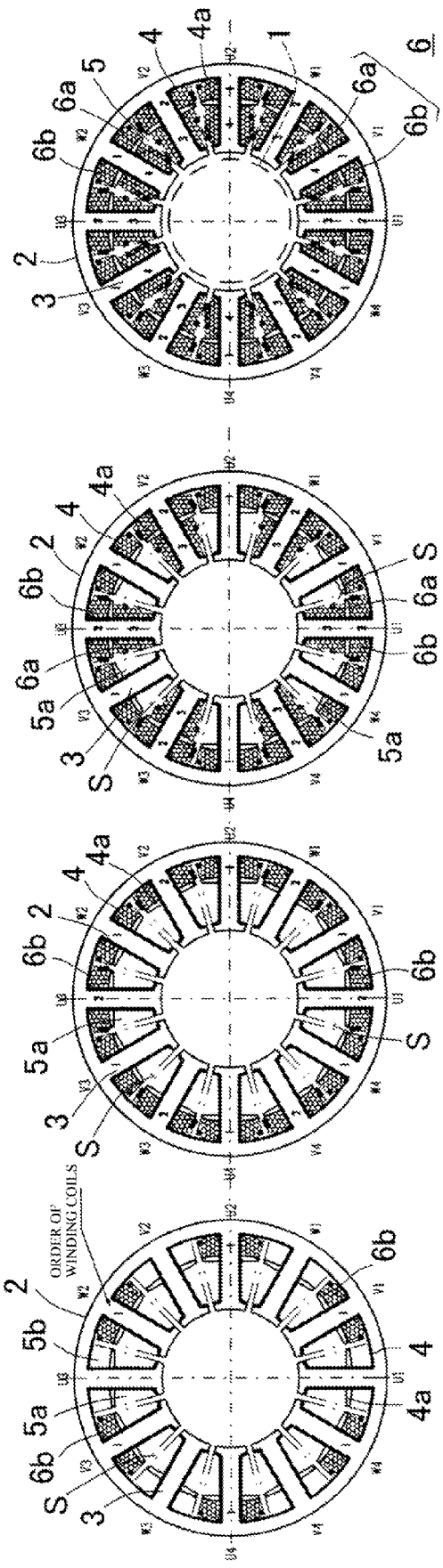
FIGS. 3A-3D are explanation views showing a third embodiment of the method of the present invention.

Preferred embodiments of the present invention will now be described in detail with reference to the accompanying drawings. In each of the following embodiments, a three-phase/12-slot/inner rotor-type DC blushless motor will be explained as an example of electric machinery.

Firstly, a schematic structure of the motor will be explained with reference to FIG. 1D.

In a rotor 1, a rotor magnet is attached to a shaft, which is rotatably held. The rotor magnet is integrally attached to an intermediate part of the shaft, and the both ends of the shaft are rotatably held by ball bearings.

In FIG. 1D, tooth sections (magnetic pole sections) 3 are radially-inwardly extended from a circular stator core 2. The stator core 2 is covered with an insulator 4. Slots 5 are spaces for forming motor coils (stator coils) 6. Each of the slots 5 is a space formed around each of the tooth sections 3. In each of the slots 5, the motor coil 6 is divided into a first coil 6a and a second coil 6b by partition walls 4a of the insulator 4 (see FIGS. 5A and 5B).

First Embodiment

A first embodiment of the method of the present invention will be explained with reference to FIGS. 1A-1D, etc. In the present embodiment, the circular stator core 2 has an even number (e.g., 12) of the tooth sections (magnetic pole sections) 3, which are radially-inwardly projected from the stator core 2. The motor coils (stator coils) 6 are formed on the tooth sections 3 by multiple-winding magnet wires on the tooth sections 3 covered with the insulator 4, so that the coils 6 are formed in the slots 5. The insulator 4, which covers the tooth sections 3, has partition walls 4a, each of which divides each of the slots 5 into a longitudinal inner part (inner slot 5a) and a longitudinal outer part (outer slot 5b). In each of the slots 5, as shown in FIG. 5B, the partition walls 4a are projected from the insulator 4, and a gap, which corresponds to a dead space S for inserting a nozzle of a wire coiling machine (not shown), is formed between the partition walls 4a. Note that, the magnet wire 7 of the motor coils 6, whose diameter is φ1.5, is multiple-wound to correspond to φ2.1 (wire diameter).

In FIG. 1A, winding coils is started from the tooth sections 3 of U1-, W1-, V2-, U3-, W3- and V4-phases. Nozzles of the wire coiling machine are inserted into the inner slots 5a of the slots 5 formed around the tooth sections 3, in a direction of stacking stator cores (a direction parallel to an axial direction of the motor), so as to form the first coils 6a in the inner slots 5a alternately. Namely, the first coils 6a are alternately arranged in the circumferential direction of the circular stator core 2. Note that, winding coils may be started from V1-, U2-, W2-, V3-, U4- and W4-phases.

Figure 5A:
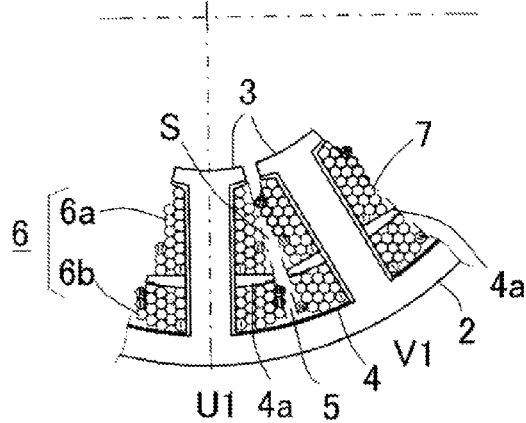
FIG. 5A is an explanation view showing number of winding magnet wires.
Figure 5B:
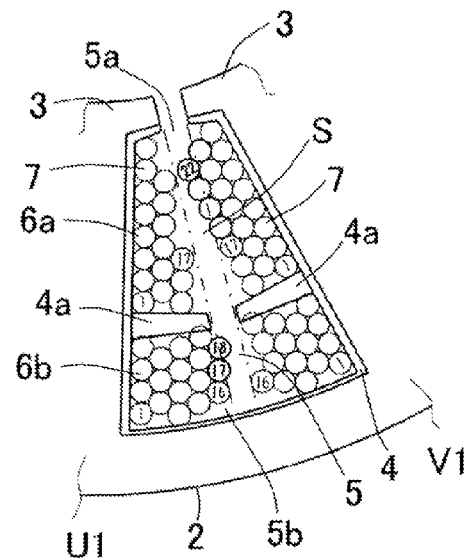
FIG. 5B is an enlarged view of a slot.

As shown in FIGS. 5A and 5B, the magnet wire 7 is radially wound, in the inner slot 5a corresponding to the tooth section 3 of the U1-phase, from a position near the partition wall 4a toward an inner end of the inner slot 5a so as to form a first layer of the coil, a second layer is radially wound from the inner end until reaching the partition wall 4a, and a third layer is zigzag-wound until reaching a position short of the dead space S. In FIG. 1A, 17 turns (T) of the magnetic wires are wound in the inner slots 5a of the U1- and U3-phases. Note that, the magnetic wires 7 of $17^{th}$ turn, which are wound as the outermost layers, do not get into the dead spaces S.

Next, in FIG. 1B, the nozzles are inserted into the vacant outer slots 5b corresponding to the uncoiled tooth sections 3, in the direction of stacking stator cores, so as to form the second coils 6b in the outer slots 5b alternately. Namely, the second coils 6b are also alternately arranged in the circumferential direction of the circular stator core 2. Concretely, the coils 6b are formed in the outer slots 5b corresponding to the tooth sections 3 of the V1-, U2-, W2-, V3-, U4- and W4-phases.

As shown in FIGS. 5A and 5B, the magnet wire 7 is radially wound, in the outer slot 5b corresponding to the tooth section 3 of the V1-phase, from a position near an outer end of the outer slot 5b toward the partition wall 4a so as to form a first layer of the coil, a second layer is radially wound from the partition wall 4a toward the outer end, a third layer is radially wound from the outer end toward the partition wall 4a, a fourth layer is radially wound from the partition wall 4a toward the outer end, and a fifth layer is zigzag-wound until reaching a position short of the dead space S. In FIG. 1B, 16 T of the magnetic wires are wound in the outer slots 5b of the U2- and U4-phases. Therefore, the first coils 6a and the second coils 6b, which are regular-wound on the tooth sections 3, are zigzag-arranged.

In FIG. 1C, the nozzles of the wire coiling machine are inserted into the vacant outer slots 5b, which correspond to the tooth sections 3 of the U1-, W1-, V2-, U3-, W3- and V4-phases, in the direction of stacking stator cores, so as to form the second coils 6b.

In FIGS. 5A and 5B, the magnet wire 7 is radially wound, in the outer slot 5b corresponding to the tooth section 3 of the U1-phase, from a position near an outer end of the outer slot 5b toward the partition wall 4a so as to form a first layer of the coil, a second layer is radially wound from the partition wall 4a toward the outer end, a third layer is radially wound from the outer end toward the partition wall 4a, a fourth layer is radially wound from the partition wall 4a toward the outer end, and a fifth layer is zigzag-wound to get into the dead space S. In FIG. 1C, 18 T of the magnetic wires are wound in the outer slots 5b of the U1- and U3-phases. Note that, the magnetic wires 7 of $17^{th}$ and $18^{th}$ turn, which are wound as the outermost layers, get into the dead spaces S, but they do not interfere with the adjacent coils 6b. Therefore, the second coils 6b, which are regular-wound, are formed in all of the outer slots 5b.

Next, in FIG. 1D, the nozzles of the wire coiling machine are inserted into the vacant inner slots 5a, which correspond to the tooth sections 3 of the V1-, U2-, W2-, V3-, U4- and W4-phases, in the direction of stacking stator cores, so as to form the first coils 6a.

In FIGS. 5A and 5B, the magnet wire 7 is radially wound, in the inner slot 5a corresponding to the tooth section 3 of the V1-phase, from a position near the partition wall 4a toward an inner end of the inner slot 5a so as to form a first layer of the coil, a second layer is radially wound from the inner end toward the partition wall 4a, and a third layer is radially wound from the partition wall 4a toward the inner end. The third layer is zigzag-wound, to get into the dead space S. In FIG. 1D, 22 T of the magnetic wires are wound in the inner slots 5a of the U2- and U4-phases. Note that, the magnetic wires 7 of $21^{st}$ and $22^{nd}$ turn, which are wound as the outermost layer, get into the dead spaces S, but they do not interfere with the adjacent coils 6a. Numbers of winding coils on the tooth sections 3 of the U-phase shown in FIGS. 1A-1D are as follows: the U1-phase/35 T; the U2-phase/38 T; the U3-phase/35 T; and the U4-phase/38 T. Numbers of winding coils of the V- and W-phases are the same as that of the U-phase.

The numbers of winding the coils 6 (the first coils 6a and the second coils 6b) shown in FIG. 5A, which were wound in 12 slots 5 (the inner slots 5a and the outer slots 5b), were compared with those of the conventional coils shown in FIGS. 12A and 12B. Note that, stator cores of the samples were three-phase/12-slots cores having the same size.

Firstly, in the sample of the present embodiment, the magnet wire having a diameter of $\phi1.5$ was multiple-wound, as shown in FIG. 5A, to correspond to $\phi$ 2.1 (wire diameter).

As to the inner slots 5a, 22 T of the magnet wires were wound on six slots (V1-, U2-, W2-, V3-, U4- and W4-phases), and 17 T of the magnet wires were wound on six slots (U1-, W1-, V2-, U3-, W3- and V4-phases). Namely, a total number of turns was 22 T×6+17 T×6=234 T. Next, as to the outer slots 5b, 16 T of the magnet wires were wound on six slots (V1-, U2-, W2-, V3-, U4- and W4-phases), and 18 T of the magnet wires were wound on six slots (U1-, W1-, V2-, U3-, W3- and V4-phases). Namely, a total number of turns was 16 T×6+18 T×6=204 T.

On the other hand, in the sample of the conventional technology, the magnet wire having a diameter of $\phi2.1$ was multiple-wound, as shown in FIG. 12A, to correspond to $\phi1.5$ (wire diameter). In this case, 7 T of the magnet wires were wound on 12 slots. Namely, a total number of turn was only 84 T.

Further, in another sample of the conventional technology, the magnet wire having a diameter of 01.5 was multiple-wound, as shown in FIG. 12B, to correspond to $\phi2.1$ (wire diameter). As to the inner slots 5a, 17 T of the magnet wires (the coils 54a) were wound on 12 slots. Namely, a total number of turn was 17 T×12-204 T. As to the outer slots 5b, 16 T of the magnet wires (the coils 54b) were wound on 12 slots. Namely, a total number of turn was 16 T×12=192 T.

In the method of the first embodiment, by winding the magnet wires on the tooth sections 3 of the stator core 2 in the above described order, the stator coils 6 can be formed in not only the slots 5, which are respectively formed around the tooth sections 3, but also the gaps, which are formed between the adjacent slots 5 and regarded as the dead spaces S. Therefore, space factor of the coils 6 can be improved, and performance of the motor can be also improved.

By the partition walls 4a of the insulator 4, inferior winding of the coils 6a and 6b, which are multiple-wound in the inner slots 5a and the outer slots 5b, can be prevented, so that regular winding can be well performed and the space factor of the coils can be improved.

Second Embodiment

A second embodiment of the method of the present invention will be explained with reference to FIGS. 2A-2D, etc. Note that, the structural elements described in the first embodiment are assigned the same symbols, and explanation will be omitted.

In FIG. 2A, winding coils is started from the tooth sections 3 of V1-, U2-, W2-, V3-, U4- and W4-phases. The nozzles of the wire coiling machine are inserted into the outer slots 5b of the slots 5 formed around the tooth sections 3, in the direction of stacking stator cores (the direction parallel to an axial direction of the motor), so as to form the second coils 6b in the outer slots 5b alternately. Namely, the second coils 6b are alternately arranged in the circumferential direction of the circular stator core 2. Note that, winding coils may be started from U1-, W1-, V2-, U3-, W3- and V4-phases.

As shown in FIGS. 5A and 5B, the magnet wire 7 is radially wound, in the outer slot 5b corresponding to the tooth section 3 of the V1-phase, from a position near outer end of the outer slot 5b toward the partition wall 4a so as to form a first layer of the coil, a second layer is radially wound from the partition wall 4a toward the outer end, a third layer is radially wound from the outer end toward the partition wall 4a, a fourth layer is radially wound from the partition wall 4a toward the outer end, and a fifth layer is zigzag-wound until reaching a position short of the dead space S. In FIG. 2A, 16 T of the magnetic wires are wound in the outer slots 5b of the U2- and U4-phases. Note that, the magnetic wires 7 of $16^{th}$ turn do not get into the dead spaces S.

Next, in FIG. 2B, the nozzles are inserted into the vacant inner slots 5a corresponding to the uncoiled tooth sections 3, in the direction of stacking stator cores, so as to form the coils 6a in the inner slots 5a alternately. Namely, the first coils 6a are also alternately arranged in the circumferential direction of the circular stator core 2. Concretely, the coils 6a are formed in the inner slots 5a corresponding to the tooth sections 3 of the U1-, W1-, V2-, U3-, W3- and V4-phases.

As shown in FIGS. 5A and 5B, for example, the magnet wire 7 is radially wound, in the inner slot 5a corresponding to the tooth section 3 of the U1-phase, from a position near the partition wall 4a toward an inner end of the inner slot 5a so as to form a first layer of the coil, a second layer is radially wound from the inner end toward the partition wall 4a, and a third layer is zigzag-wound until reaching a position short of the dead space S. In FIG. 2B, 17 T of the magnetic wires are wound in the inner slots 5a of the U1- and U3-phases. Note that, the magnetic wires 7 of $17^{th}$ turn do not get into the dead spaces S.

Therefore, the first coils 6a and the second coils 6b, which are regular-wound on the tooth sections 3, are zigzag-arranged.

In the state where the first coils 6a and the second coils 6b are zigzag-arranged as shown in FIG. 2B, the nozzles of the wire coiling machine is inserted into the vacant outer slots 5b, which correspond to the tooth sections 3 of the U1-, W1-, V2-, U3-, W3- and V4-phases, in the direction of stacking stator cores, so as to form the second coils 6b as shown in FIG. 2C.

In FIGS. 5A and 5B, the magnet wire 7 is radially wound, in the outer slot 5b corresponding to the tooth section 3 of the U1-phase, from a position near an outer end of the outer slot 5b toward the partition wall 4a so as to form a first layer of the coil, a second layer is radially wound from the partition wall 4a toward the outer end, a third layer is radially wound from the outer end toward the partition wall 4a, a fourth layer is radially wound from the partition wall 4a toward the outer end, and a fifth layer is zigzag-wound to get into the dead space S. In FIG. 2C, 18 T of the magnetic wires are wound in the outer slots 5b of the U1- and U3-phases. Note that, the magnetic wires 7 of $17^{th}$ and $18^{th}$ turn get into the dead spaces S, but they do not interfere with the adjacent coils 6b. Therefore, the second coils 6b, which are regular-wound, are formed in all of the outer slots 5b.

Next, in FIG. 2D, the nozzles of the wire coiling machine are inserted into the vacant inner slots 5a, which correspond to the tooth sections 3 of the V1-, U2-, W2-, V3-, U4- and W4-phases, in the direction of stacking stator cores, so as to form the first coils 6a.

In FIGS. 5A and 5B, the magnet wire 7 is radially wound, in the inner slot 5a corresponding to the tooth section 3 of the V1-phase, from a position near the partition wall 4a toward an inner end of the inner slot 5a so as to form a first layer of the coil, a second layer is radially wound from the inner end toward the partition wall 4a, and a third layer is zigzag-wound from the partition wall 4a toward the inner end. The third layer is zigzag-wound to get into the dead space S. In FIG. 2D, 22 T of the magnetic wires are wound in the inner slots 5a of the U2- and U4-phases. Note that, the magnetic wires 7 of $21^{st}$ and $22^{nd}$ turn get into the dead spaces S, but they do not interfere with the adjacent coils 6a. Numbers of winding coils on the tooth sections 3 of the U-phase shown in FIGS. 2A-2D are as follows: the U1-phase/35 T; the U2-phase/38 T; the U3-phase/35 T; and the U4-phase/38 T. Numbers of winding coils of the V- and W-phases are the same as that of the U-phase.

In the method of the second embodiment, by winding the magnet wires on the tooth sections 3 of the stator core 2 in the above described order, the stator coils 6 can be formed in not only the slots 5, which are respectively formed around the tooth sections 3, but also the gaps, which are formed between the adjacent slots 5 and regarded as the dead spaces S. Therefore, the space factor of the coils 6 can be improved, and performance of the motor can be also improved.

Third Embodiment

A third embodiment of the method of the present invention will be explained with reference to FIGS. 3A-3D, etc. Note that, the structural elements described in the foregoing embodiments are assigned the same symbols, and explanation will be omitted.

In FIG. 3A, winding coils is started from the tooth sections 3 of V1-, U2-, W2-, V3-, U4- and W4-phases. The nozzles of the wire coiling machine are inserted into the outer slots 5b of the slots 5 formed around the tooth sections 3, in the direction of stacking stator cores (the direction parallel to an axial direction of the motor), so as to form the second coils 6b in the outer slots 5b alternately. Namely, the second coils 6b are alternately arranged in the circumferential direction of the circular stator core 2. Note that, winding coils may be started from U1-, W1-, V2-, U3-, W3- and V4-phases.

In FIG. 3A, 16 T of the magnetic wires are wound in the outer slots 5b of the U2- and U4-phases. Note that, the magnetic wires 7 of $16^{th}$ turn do not get into the dead spaces S.

Next, in FIG. 3B, the nozzles are inserted into the vacant outer slots 5b corresponding to the tooth sections 3 having no second coils 6b, in the direction of stacking stator cores, so as to form the coils 6b in the vacant outer slots 5b. Concretely, the coils 6b are formed in the outer slots 5b corresponding to the tooth sections 3 of the U1-, W1-, V2-, U3-, W3- and V4-phases. In the present embodiment, 18 T of the magnetic wires are wound in the outer slots 5b of the U1- and U3-phases. Note that, the magnetic wires 7 of $17^{th}$ and $18^{th}$ turn get into the dead spaces S, but they do not interfere with the adjacent coils 6b. Therefore, the second coils 6b are wound on all of the tooth sections 3 and arranged in the circumferential direction of the stator core 2.

In FIG. 3C, the nozzles are inserted into the vacant inner slots 5a corresponding to the tooth sections 3 of U1-, W1-, V2-, U3-, W3- and V4-phases, in the direction of stacking stator cores, so as to form the first coils 6a in the inner slots 5a. In the present embodiment, 17 T of the magnetic wires are wound in the inner slots 5a of the U1- and U3-phases. Note that, the magnetic wires 7 of $17^{th}$ turn do not get into the dead spaces S.

Next, in FIG. 3D, the nozzles are inserted into the vacant inner slots 5a corresponding to the tooth sections 3 of the V1-, U2-, W2-, V3-, U4- and W-phases, in the direction of stacking stator cores, so as to form the coils 6a in the inner slots 5a. In the present embodiment, 22 T of the magnetic wire are wound in the inner slots 5a of the U2- and U4-phases. Note that, the magnetic wires 7 of $21^{st}$ and $22^{nd}$ turn get into the dead spaces S, but they do not interfere with the adjacent coils 6a.

Numbers of winding coils on the tooth sections 3 of the U-phase shown in FIGS. 3A-3D are as follows: the U1-phase/35 T; the U2-phase/38 T; the U3-phase/35 T; and the U4-phase/38 T. Numbers of winding coils of the V- and W-phases are the same as that of the U-phase.

In the method of the third embodiment, by winding the magnet wires on the tooth sections 3 of the stator core 2 in the above described order, the stator coils 6 can be formed in not only the slots 5, which are respectively formed around the tooth sections 3, but also the gaps, which are formed between the adjacent slots 5 and regarded as the dead spaces S. Therefore, the space factor of the coils 6 can be improved, and performance of the motor can be also improved.

Fourth Embodiment

A fourth embodiment of the method of the present invention will be explained with reference to FIGS. 4A-4D, etc. Note that, the structural elements described in the foregoing embodiments are assigned the same symbols, and explanation will be omitted.

Figures 4A, 4B, 4C, 4D:
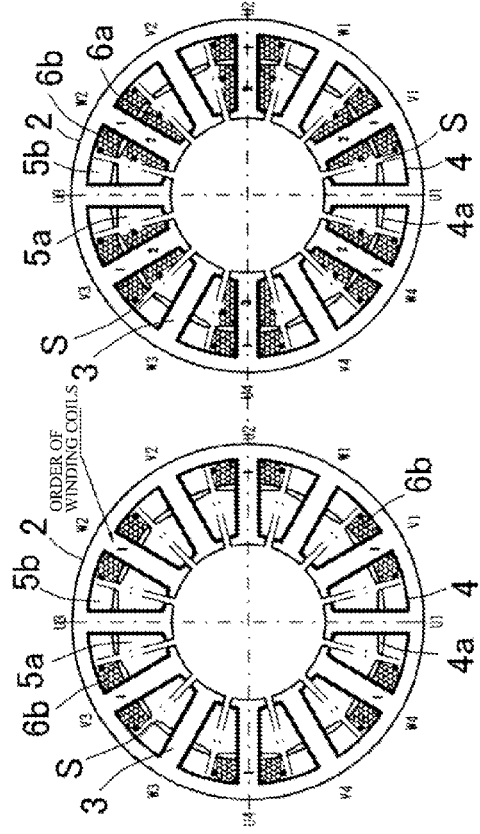
FIGS. 4A-4D are explanation views showing a fourth embodiment of the method of the present invention.

In FIG. 4A, winding coils is started from the tooth sections 3 of V1-, U2-, W2-, V3-, U4- and W4-phases. The nozzles of the wire coiling machine are inserted into the outer slots 5b of the slots 5 formed around the tooth sections 3, in the direction of stacking stator cores (the direction parallel to an axial direction of the motor), so as to form the second coils 6b in the outer slots 5b alternately. Namely, the second coils 6b are alternately arranged in the circumferential direction of the circular stator core 2. Note that, winding coils may be started from U1-, W1-, V2-, U3-, W3- and V4-phases. In FIG. 4A, 16 T of the magnetic wires are wound in the outer slots 5b of the U2- and U4-phases. Note that, the magnetic wires 7 of $16^{th}$ turn do not get into the dead spaces S.

Next, in FIG. 4B, the nozzles are inserted into the vacant inner slots 5a corresponding to the tooth sections 3 having the second coils 6b, in the direction of stacking stator cores, so as to form the coils 6a in the inner slots 5a. Concretely, the coils 6a are formed in the inner slots 5a corresponding to the tooth sections 3 of the V1-, U2-, W2-, V3-, V4- and W4-phases. In FIG. 4B, 17 T and 19 T of the magnetic wires are wound in the inner slots 5a of the U2- and U4-phases. Note that, the magnetic wires 7 of $17^{th}$ and $22^{nd}$ turn do not get into the dead spaces S. Therefore, the coils (the first and second coils 6a and 6b) are alternately wound on the tooth sections 3 and arranged in the circumferential direction of the stator core 2.

In FIG. 4C, the nozzles are inserted into the vacant outer slots 5b corresponding to the tooth sections 3 of U1-, W1-, V2-, U3-, W3- and V4-phases, on which no coils are wound, in the direction of stacking stator cores, so as to form the second coils 6b in the outer slots 5b. In FIG. 4C, 18 T of the magnetic wires are wound in the outer slots 5b of the U1- and U3-phases. Note that, the magnetic wires 7 of $17^{th}$ and $28^{th}$ turn get into the dead spaces S, but they do not interfere with the adjacent coils 6b.

Next, in FIG. 4D, the nozzles are inserted into the vacant inner slots 5a corresponding to the tooth sections 3 of the U1-, W1-, V2-, U3-, W3- and V4-phases, in the direction of stacking stator cores, so as to form the coils 6a in the inner slots 5a. In the present embodiment, 22 T of the magnetic wires are wound in the inner slots 5a of the U1- and U3-phases. Note that, the magnetic wires 7 of $21^{st}$ and $22^{nd}$ turn get into the dead space S, but they do not interfere with the adjacent coils 6a.

Numbers of winding coils on the tooth sections 3 of the U-phase shown in FIGS. 4A-4D are as follows: the U1-phase/40 T; the U2-phase/33 T; the U3-phase/40 T; and the U4-phase/35 T. Numbers of winding coils (T) of the V- and W-phases are the same as that of the U-phase.

Figure 6A:
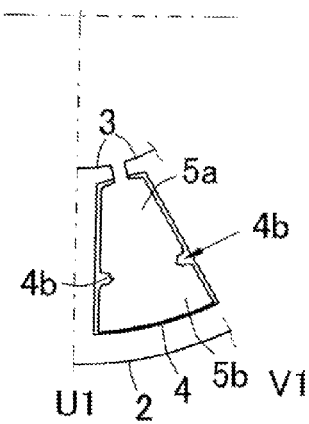
FIGS. 6A-6C are explanation views of another insulator and coils wound thereon.
Figure 6B:
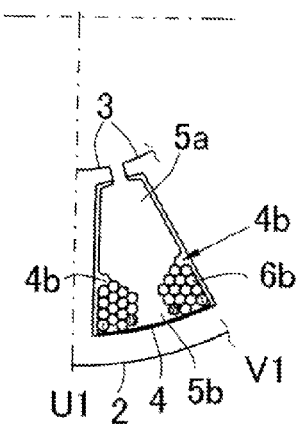
Figure 6C:
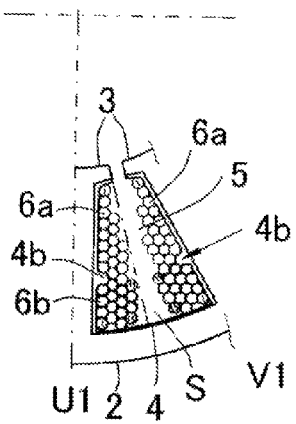

Note that, the adjacent partition walls 4a are separated with a clearance corresponding to the dead space S. The present invention is not limited to the above described partition walls 4a. As shown in FIG. 6A, small projections 4b may be employed instead of the partition walls 4a. The length of the projections 4b may be optionally selected as far as inferior winding can be prevented. For example, as shown in FIGS. 6B and 6C, the projections 4b support first layers and second layers of the inner coil 6a and the outer coil 6b, which are wound on the tooth section 3, so that inferior winding can be prevented.

In the method of the fourth embodiment, by winding the magnet wires on the tooth sections 3 of the stator core 2 in the above described order, the stator coils 6 can be formed in not only the slots 5, which are respectively formed around the tooth sections 3, but also the gaps, which are formed between the adjacent slots 5 and regarded as the dead spaces S. Therefore, the space factor of the coils 6 can be improved, and performance of the motor can be also improved.

Fifth Embodiment

A fifth embodiment of the method of the present invention will be explained with reference to FIGS. 7A-7D, etc. Note that, the structural elements described in the foregoing embodiments are assigned the same symbols, and explanation will be omitted. In the present embodiment, the insulator 4, which covers the stator core 2 and the tooth sections 3, has no partition walls 4a.

Winding coils may be started from U1-, W1-, V2-, U3-, W3- and V4-phases. In FIG. 7A, the nozzles of the wire coiling machine are inserted into longitudinal outer parts of the slots 5 formed around the tooth sections 3, in the direction of stacking stator cores (the direction parallel to an axial direction of the motor), so as to form the second coils 6b in the longitudinal outer parts alternately. Namely, the second coils 6b are alternately arranged in the circumferential direction of the circular stator core 2. Note that, winding coils may be started from V1-, U2-, W2-, V3-, U4- and W4-phases.

Figure 8A:
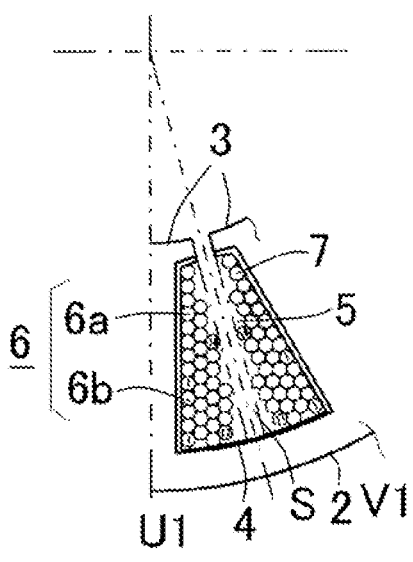
FIG. 8A is an explanation view explaining number of winding magnet wires per slot, wherein the magnet wires are wound by the conventional method.
Figure 8B:
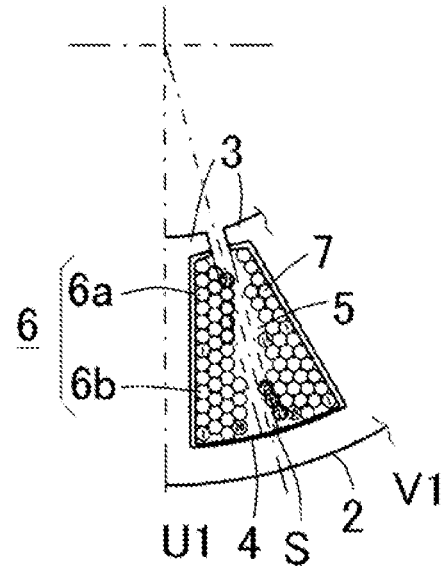
FIG. 8B is an explanation view explaining number of winding magnet wires per slot, wherein the magnet wires are wound by the method of the fifth embodiment.

As shown in FIG. 8B, the magnet wire 7 is radially wound, on the tooth section 3 of the U1-phase, from a position near an outer end of the longitudinal outer part until reaching an intermediate position of the slot, so as to form a first layer. A second layer is radially wound from the intermediate position toward the outer end. A third layer is radially-inwardly wound from the outer end. A fourth layer is zigzag-wound from a position outside of the dead space S toward the outer end. Note that, in FIG. 7A, 20 T of the magnetic wire is wound in the tooth sections 3 of the U1- and U3-phases.

In FIG. 7B, the nozzles are inserted into the vacant slots 5 corresponding to the tooth sections 3 having no second coils 6b, in the direction of stacking stator cores, so as to form the coils 6b in the vacant longitudinal outer parts of the slots 5. Concretely, the coils 6b are formed in the longitudinal outer parts of the slots 5 corresponding to the tooth sections 3 of the V1-, U2-, W2-, V3-, U4- and W4-phases.

As shown in FIG. 8B, the magnet wire 7 is radially wound, on the tooth section 3 of the V1-phase, from a position near an outer end of the longitudinal outer part until reaching an intermediate position of the slot, so as to form a first layer. A second layer is radially-outwardly wound from the intermediate position toward the outer end. A third layer is radially-inwardly wound from the outer end. A fourth layer is radially wound from the intermediate position toward the outer end. $21^{st}$-$23^{rd}$ turn of a fifth layer is zigzag-wound from the outer end to get into the dead space S, but they do not interfere with the adjacent coils 6b. In FIG. 7B, 23 T of the magnetic wires are wound in the tooth sections 3 of the U2- and U4-phases. The second coils 6b, which are regular-wound, are arranged in the circumferential direction of the stator core 2.

In FIG. 7C, the nozzles are inserted into longitudinal inner parts of the slots 5, in which the second coils 6b are formed, in the direction of stacking stator cores, so as to form the coils 6a in the longitudinal inner parts of the slots 5 alternately. Concretely, the coils 6a are formed in the longitudinal inner parts of the slots 5 corresponding to the tooth sections 3 of the V1-, U2-, W2-, V3-, U4- and W4-phases.

As shown in FIG. 8B, the magnet wire 7 is radially-inwardly wound, on the tooth section 3 of the V1-phase, from a position near an intermediate position of the slot toward an inner end of the longitudinal inner part, so as to form a first layer. A second layer is radially wound from the inner end toward the intermediate position. A third layer is zigzag-wound toward the inner end without getting into the dead space S. Note that, in FIG. 7C, 14 T of the magnetic wires are wound in the tooth sections 3 of the U2- and U4-phases as the coils 6a.

Next, in FIG. 7D, the nozzles are inserted into vacant longitudinal inner parts of the slots 5 corresponding to the tooth sections 3 of the U1-, W1-, V2-, U3-, W3- and V4-phases, in the direction of stacking stator cores, so as to form the coils 6a in the longitudinal inner parts of the slots 5. In the present embodiment, 21 T of the magnetic wires are wound on the tooth sections 3 of the U1- and U3-phases. Note that, the magnetic wires 7 of $21^{st}$ turn get into the dead spaces S, but they do not interfere with the adjacent coils 6a.

Numbers of winding coils on the tooth sections 3 of the U-phase shown in FIGS. 7A-7D are as follows: the U1-phase/41 T; the U2-phase/37 T; the U3-phase/41 T; and the U4-phase/37 T. Numbers of winding coils (T) of the V- and W-phases are the same as that of the U-phase.

The numbers of winding the coils 6 (the first coils 6a and the second coils 6b) shown in FIG. 8B, which were wound in 12 slots 5 (the longitudinal inner parts and the longitudinal outer parts), were compared with those of the conventional coils shown in FIG. 8A.

Firstly, in the sample of the present embodiment, the magnet wire having a diameter of φ1.5 was multiple-wound, as shown in FIG. 8B, to correspond to φ2.1 (wire diameter).

As to the longitudinal inner parts of the slots 5, 21 T of the magnet wires were wound on six slots, and 14 T of the magnet wires were wound on six slots. Namely, a total number of turn was 210 T. Next, as to the longitudinal outer parts of the slots 5, 20 T of the magnet wires were wound on six slots, and 23 T of the magnet wires were wound on six slots. Namely, a total number of turn was 258 T.

On the other hand, in the sample of the conventional technology shown in FIG. 8A, 216 T (18 T×12 slots) of the magnet wires were wound on the longitudinal inner parts of the slots 5, but only 204 T (17 T×12 slots) of the magnet wires were wound on the longitudinal outer parts of the slots 5.

In the method of the present embodiment, by winding the magnet wires on the tooth sections 3 of the stator core 2 in the above described order, the stator coils 6 can be formed in not only the slots 5, which are respectively formed around the tooth sections 3, but also the gaps, which are formed between the adjacent slots 5 and regarded as the dead spaces S. Therefore, the space factor of the coils 6 can be improved, and performance of the motor can be also improved. Further, even if the insulator 4 has no partition walls, the coils can be wound without inferior winding.

Sixth Embodiment

A sixth embodiment of the method of the present invention will be explained with reference to FIGS. 9A-9D, etc. Note that, the structural elements described in the foregoing embodiments are assigned the same symbols, and explanation will be omitted.

In FIG. 9A, winding coils is started from the tooth sections 3 of U1-, W1-, V2-, U3-, W3- and V4-phases. The nozzles of the wire coiling machine are inserted into longitudinal outer parts of the slots 5 formed around the tooth sections 3, in the direction of stacking stator cores (the direction parallel to an axial direction of the motor), so as to form the second coils 6b in the outer slots 5b (the longitudinal outer parts) alternately. Namely, the second coils 6b are alternately arranged in the circumferential direction of the circular stator core 2. Note that, winding coils may be started from V1-, U2-, W2-, V3-, U4- and W4-phases. In FIG. 9A, 20 T of the magnetic wires are wound in the slots 5 of the U1- and U3-phases. Note that, the magnetic wires 7 of the outermost layers are wound without getting into the dead spaces S.

Next, in FIG. 9B, the nozzles are inserted into the inner slots 5a (longitudinal inner parts of the slots 5) corresponding to the tooth sections 3 having the second coils 6b, in the direction of stacking stator cores, so as to form the coils 6a in the longitudinal inner parts. Concretely, the coils 6a are formed in the longitudinal inner parts of the slots 5 corresponding to the tooth sections 3 of the U1-, W1-, V2-, U3-, W3- and V4-phases. In FIG. 9B, 14 T of the magnetic wires are wound in the longitudinal inner parts of the U1- and U3-phases. Note that, the magnetic wires 7 of the outermost layers are wound without getting into the dead spaces S. Therefore, the coils (the first and second coils 6a and 6b) are regular-wound on the tooth sections 3 alternately and arranged in the circumferential direction of the stator core 2.

In FIG. 9C, the nozzles are inserted into the slots 5 corresponding to the tooth sections 3 of V1-, U2-, W2-, V3-, U4- and W4-phases, on which no coils are wound, in the direction of stacking stator cores, so as to form the second coils 6b in longitudinal outer parts of the slots 5. In FIG. 9C, 23 T of the magnetic wires are wound in the slots 5 of the U2- and U4-phases. Note that, the magnetic wires 7 of the outermost layers get into the dead spaces S, but they do not interfere with the adjacent coils 6b.

Next, in FIG. 9D, the nozzles are inserted into the vacant longitudinal inner parts of the slots 5 corresponding to the tooth sections 3 of the V1-, U2-, W2-, V3-, U4- and W4-phases, in the direction of stacking stator cores, so as to form the coils 6a. In the present embodiment, 21 T of the magnetic wires are wound in the slots 5 of the U2- and U4-phases. Note that, the magnetic wires 7 of the outermost layers get into the dead spaces S, but they do not interfere with the adjacent coils 6a.

Numbers of winding coils on the tooth sections 3 of the U-phase shown in FIGS. 9A-9D are as follows: the U1-phase/34 T; the U2-phase/44 T; the U3-phase/34 T; and the U4-phase/44 T. Numbers of winding coils (T) of the V- and W-phases are the same as that of the U-phase.

In the method of the present embodiment, by winding the magnet wires on the tooth sections 3 of the stator core 2 in the above described order, the stator coils 6 can be formed in not only the slots 5, which are respectively formed around the tooth sections 3, but also the gaps, which are formed between the adjacent slots 5 and regarded as the dead spaces S. Therefore, the space factor of the coils 6 can be improved, and performance of the motor can be also improved. Further, even if the insulator 4 has no partition walls, the coils can be wound without inferior winding.

Seventh Embodiment

A seventh embodiment of the method of the present invention will be explained with reference to FIGS. 10A-10D, etc. Note that, the structural elements described in the foregoing embodiments are assigned the same symbols, and explanation will be omitted.

In FIG. 10A, winding coils is started from the tooth sections 3 of U1-, W1-, V2-, U3-, W3- and V4-phases. The nozzles of the wire coiling machine are inserted into longitudinal outer parts of the slots 5 formed around the tooth sections 3, in the direction of stacking stator cores (the direction parallel to an axial direction of the motor), so as to form the second coils 6b in the outer slots 5b (the longitudinal outer parts) alternately. Namely, the second coils 6b are alternately arranged in the circumferential direction of the circular stator core 2. Note that, winding coils may be started from V1-, U2-, W2-, V3-, U4- and W4-phases. In FIG. 10A, 20 T of the magnetic wires are wound in the slots 5 of the U1- and U3-phases. Note that, the magnetic wires 7 of the outermost layers are wound without getting into the dead spaces S.

Next, in FIG. 10B, the nozzles are inserted into longitudinal inner parts of the slots 5 corresponding to the tooth sections 3 having no second coils 6b, in the direction of stacking stator cores, so as to form the coils 6a in the longitudinal inner parts alternately. Concretely, the coils 6a are formed in the longitudinal inner parts of the slots 5 corresponding to the tooth sections 3 of the V1-, U2-, W2-, V3-, U4- and W4-phases. In FIG. 10B, 23 T of the magnetic wires are wound in the longitudinal inner parts of the U2- and U4-phases. Note that, the magnetic wires 7 of the outermost layers are wound without getting into the dead spaces S. Therefore, the first and second coils 6a and 6b, which are regular-wound on the tooth sections 3, are zigzag-arranged in the stator core 2.

The first and second coils 6a and 6b have been zigzag-arranged as shown in FIG. 10B. Thus, as shown in FIG. 10C, the nozzles are inserted into the vacant longitudinal outer parts of the slots 5 corresponding to the tooth sections 3 of V1-, U2-, W2-, V3-, U4- and W4-phases, in the direction of stacking stator cores, so as to form the second coils 6b in longitudinal outer parts of the slots 5.

In FIG. 10C, 17 T of the magnetic wires are wound in the slots 5 of the U2- and U4-phases. Note that, the magnetic wires 7 of the outermost layers get into the dead spaces S, but they do not interfere with the adjacent coils 6b.

Next, in FIG. 10D, the nozzles are inserted into the vacant longitudinal inner parts of the slots 5 corresponding to the tooth sections 3 of the U1-, W1-, V2-, U3-, W3- and V4-phases, in the direction of stacking stator cores, so as to form the coils 6a. In the present embodiment, 20 T of the magnetic wires are wound in the slots 5 of the U1- and U3-phases. Note that, the magnetic wires 7 of the outermost layers get into the dead spaces S, but they do not interfere with the adjacent coils 6a.

Numbers of winding coils on the tooth sections 3 of the U-phase shown in FIGS. 10A-10D are as follows: the U1-phase/41 T; the U2-phase/40 T; the U3-phase/41 T; and the U4-phase/40 T. Numbers of winding coils (T) of the V- and W-phases are the same as that of the U-phase.

In the method of the present embodiment, by winding the magnet wires on the tooth sections 3 of the stator core 2 in the above described order, the stator coils 6 can be formed in not only the slots 5, which are respectively formed around the tooth sections 3, but also the gaps, which are formed between the adjacent slots 5 and regarded as the dead spaces S. Therefore, the space factor of the coils 6 can be improved, and performance of the motor can be also improved. Further, the insulator 4 has no partition walls, but the coils can be wound without inferior winding.

Eighth Embodiment

An eighth embodiment of the method of the present invention will be explained with reference to FIGS. 11A-11D, etc. Note that, the structural elements described in the foregoing embodiments are assigned the same symbols, and explanation will be omitted.

Figure 11A:
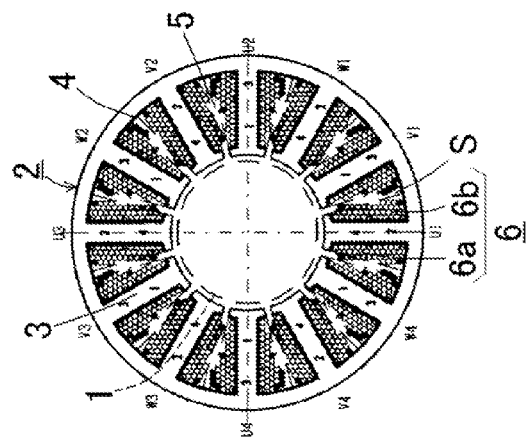
FIGS. 11A-11D are explanation views showing a eighth embodiment of the method of the present invention.

In FIG. 11A, winding coils is started from the tooth sections 3 of V1-, U2-, W2-, V3-, U4- and W4-phases. The nozzles of the wire coiling machine are inserted into longitudinal inner parts of the slots 5 formed around the tooth sections 3, in the direction of stacking stator cores (the direction parallel to an axial direction of the motor), so as to form the first coils 6a in the longitudinal inner parts alternately. Namely, the first coils 6a are alternately arranged in the circumferential direction of the circular stator core 2. Note that, winding coils may be started from U1-, W1-, V2-, U3-, W3- and V4-phases. In FIG. 11A, 23 T of the magnetic wires are wound in the slots 5 of the U2- and U4-phases. Note that, the magnetic wires 7 of the outermost layers are wound without getting into the dead spaces S.

Figure 11B:
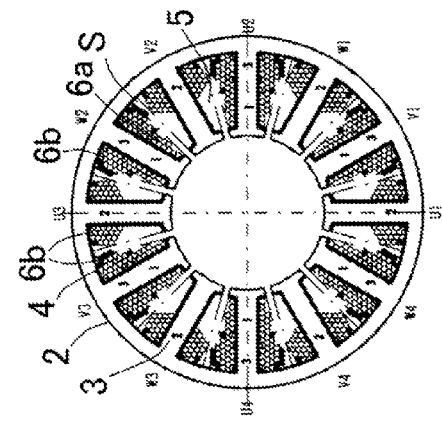

Next, in FIG. 11B, the nozzles are inserted into longitudinal outer parts of the slots 5 corresponding to the tooth sections 3 having no coils, in the direction of stacking stator cores, so as to form the coils 6b in the longitudinal outer parts alternately. Concretely, the coils 6b are formed in the longitudinal outer parts of the slots 5 corresponding to the tooth sections 3 of the U1-, W1-, V2-, U3-, W3- and V4-phases. In FIG. 11B, 21 T of the magnetic wires are wound in the longitudinal outer parts of the U1- and U3-phases. Therefore, the first and second coils 6a and 6b, which are regular-wound on the tooth sections 3, are zigzag-arranged in the stator core 2.

Figure 11C:
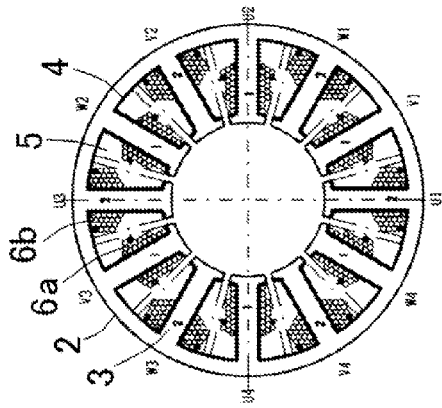

The first and second coils 6a and 6b have been zigzag-arranged as shown in FIG. 11B. Thus, as shown in FIG. 11C, the nozzles are inserted into the vacant longitudinal outer parts of the slots 5 corresponding to the tooth sections 3 of V1-, U2-, W2-, V3-, U4- and W4-phases, in the direction of stacking stator cores, so as to form the second coils 6b in longitudinal outer parts of the slots 5. In FIG. 11C, 17 T of the magnetic wires are wound in the slots 5 of the U2- and U4-phases. Note that, the magnetic wires 7 of the outermost layers get into the dead space S, but they do not interfere with the adjacent coils 6b.

Figure 11D:
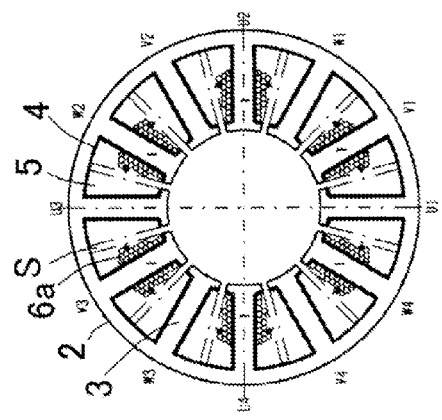

Next, in FIG. 11D, the nozzles are inserted into the vacant longitudinal inner parts of the slots 5 corresponding to the tooth sections 3 of the U1-, W1-, V2-, U3-, W3- and V4-phases, in the direction of stacking stator cores, so as to form the coils 6a. In FIG. 11D, 20 T of the magnetic wires are wound in the slots 5 of the U1- and U3-phases. Note that, the magnetic wires 7 of the outermost layers get into the dead spaces S, but they do not interfere with the adjacent coils 6a.

Numbers of winding coils on the tooth sections 3 of the U-phase shown in FIGS. 11A-11D are as follows: the U1-phase/41 T; the U2-phase/40 T; the U3-phase/41 T; and the U4-phase/40 T. Numbers of winding coils (T) of the V- and W-phases are the same as that of the U-phase.

In the method of the present embodiment, by winding the magnet wires on the tooth sections 3 of the stator core 2 in the above described order, the stator coils 6 can be formed in not only the slots 5, which are respectively formed around the tooth sections 3, but also the gaps, which are formed between the adjacent slots 5 and regarded as the dead spaces S. Therefore, the space factor of the coils 6 can be improved, and performance of the motor can be also improved. Further, the insulator 4 has no partition walls, but the coils can be wound without inferior winding.

In each of the above described embodiments, the stator coils 6 can be formed in not only the slots 5, which are respectively formed around the tooth sections 3, but also the gaps, which are formed between the adjacent slots 5 and regarded as the dead spaces S. Therefore, numbers of winding the coils 6 can be increased, the space factor of the coils 6 can be improved, and performance of the motor can be also improved.

In each of the above described embodiments, the stator of the inner rotor-type electric machinery has been explained, but the present invention can be applied to outer rotor-type electric machinery.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention has been described in detail, it should be understood that the various changes, substitutions, and alternations could be made hereto without departing from the spirit and scope of the invention.

What is claimed is:

1. A method of forming stator coils of a stator of electric machinery, the stator including: a circular stator core; an even number of tooth sections radially projecting from the stator core; a plurality of slots, each slot being a space formed around one of the tooth sections, each of the slots being divided into a longitudinal outer part and a longitudinal inner part; an insulator covering the stator core and the tooth sections; and stator coils respectively formed in the slots by multiple-winding a magnet wire on the tooth sections, said method comprising the steps of:
 (a) regularly winding the magnet wire in vacant longitudinal outer parts of alternate slots, without getting into spaces for inserting a nozzle of a wire coiling machine, whereby the slots have alternating wound and vacant longitudinal outer parts;
 (b) following said step (a), regularly winding the magnet wire in the vacant longitudinal outer parts of the slots sequentially and inserting at least a terminal end of the outermost layer of the magnet wire into the space for inserting the nozzle of the wire coiling machine;
 (c) following said step (b), regularly winding the magnet wire in vacant longitudinal inner parts of alternate slots, without getting into spaces for inserting the nozzle of the wire coiling machine, whereby the slots have alternating wound and vacant longitudinal inner parts; and
 (d) following said step (c), regularly winding the magnet wire in the vacant longitudinal inner parts of the slots sequentially and inserting at least a terminal end of the outermost layer of the magnet wire into the space for inserting the nozzle of the wire coiling machine, whereby the coils are arranged in the circumferential direction of the motor core.

2. The method according to claim 1,
wherein the insulator, which covers the tooth sections, has partition walls, each of which divides each of the slots into the longitudinal outer part and the longitudinal inner part.

3. A method of forming stator coils of a stator of electric machinery, the stator including: a circular stator core; an even number of tooth sections radially projecting from the stator core; pluralities of slots, each slot being a space formed around one of the tooth sections, each of the slots being divided into a longitudinal outer part and a longitudinal inner part; an insulator covering the stator core and the tooth sections; and stator coils respectively formed in the slots by multiple-winding a magnet wire on the tooth sections, said method comprising the steps of:
- (a) regularly winding the magnet wire in vacant longitudinal outer parts of alternate slots, without getting into spaces for inserting a nozzle of a wire coiling machine, whereby the slots have alternating wound and vacant longitudinal outer parts;
- (b) following said step (a), regularly winding the magnet wire in the vacant longitudinal inner parts of alternate slots, without getting into spaces for inserting the nozzle of the wire coiling machine, whereby the slots have alternating wound and vacant longitudinal inner parts;
- (c) following said step (c), regularly winding the magnet wire in the vacant longitudinal outer parts of the slots sequentially and inserting at least a terminal end of the outermost layer of the magnet wire into the space for inserting the nozzle of the wire coiling machine; and
- (d) following said step (c), regularly winding the magnet wire in the vacant longitudinal inner parts of the slots sequentially and inserting at least a terminal end of the outermost layer of the magnet wire into the space for inserting the nozzle of the wire coiling machine, whereby the coils are arranged in the circumferential direction of the motor core.

4. The method according to claim 3,
wherein the insulator, which covers the tooth sections, has partition walls, each of which divides each of the slots into the longitudinal outer part and the longitudinal inner part.

5. A method of forming stator coils of a stator of electric machinery, the stator including: a circular stator core; an even number of tooth sections radially projecting from the stator core; pluralities of slots, each slot being a space formed around one of the tooth sections, each of the slots being divided into a longitudinal outer part and a longitudinal inner part; an insulator covering the stator core and the tooth sections; and stator coils respectively formed in the slots by multiple-winding a magnet wire on the tooth sections, said method comprising the steps of:
- (a) regularly winding the magnet wire in vacant longitudinal inner parts of alternate slots, without getting into spaces for inserting a nozzle of a wire coiling machine, whereby the slots have alternating wound and vacant longitudinal inner parts;
- (b) following said step (a), regularly winding the magnet wire in vacant longitudinal outer parts of alternate slots, without getting into spaces for inserting the nozzle of the wire coiling machine, whereby the slots have alternating wound and vacant longitudinal outer parts;
- (c) following said step (b), regularly winding the magnet wire in vacant longitudinal outer parts of the slots sequentially and inserting at least a terminal end of the outermost layer of the magnet wire into the space for inserting the nozzle of the wire coiling machine; and
- (d) following said step (c), regularly winding the magnet wire in the rest vacant longitudinal inner parts of the slots sequentially and inserting at least a terminal end of the outermost layer of the magnet wire into the space for inserting the nozzle of the wire coiling machine, whereby the coils are arranged in the circumferential direction of the motor core.

6. The method according to claim 5,
wherein the insulator, which covers the tooth sections, has partition walls, each of which divides each of the slots into the longitudinal outer part and the longitudinal inner part.

\* \* \* \* \*